United States Patent
Brandt et al.

(10) Patent No.: US 7,418,239 B2
(45) Date of Patent: Aug. 26, 2008

(54) RESELECTION OPTIMIZATION IN MOBILE WIRELESS COMMUNICATION DEVICES AND METHODS THEREFOR

(75) Inventors: Steve Brandt, Round Lake, IL (US); Donald Dorsey, Vernon Hills, IL (US)

(73) Assignee: Motorola Inc., Schamuburg, IL (US)

( * ) Notice: Subject to any disclaimer, the term of this patent is extended or adjusted under 35 U.S.C. 154(b) by 1210 days.

(21) Appl. No.: 10/074,970

(22) Filed: Feb. 13, 2002

(65) Prior Publication Data
US 2003/0153271 A1  Aug. 14, 2003

(51) Int. Cl.
*H04B 17/00* (2006.01)
(52) U.S. Cl. .................................. 455/67.11
(58) Field of Classification Search ............... 455/67.1, 455/574, 435.2, 67.11; 370/311, 331, 337, 370/332
See application file for complete search history.

(56) References Cited

U.S. PATENT DOCUMENTS 6,278,703 B1 * 8/2001 Neufeld ...................... 370/342
6,480,504 B1 * 11/2002 Wang et al. .................. 370/442
6,625,467 B2 * 9/2003 New et al. .................... 455/525

FOREIGN PATENT DOCUMENTS

| WO | 0013377 A1 | 3/2000 |
|---|---|---|
| WO | 0035220 A1 | 6/2000 |
| WO | 0207459 A2 | 1/2002 |

* cited by examiner

*Primary Examiner*—Lewis West
(74) *Attorney, Agent, or Firm*—Roland K. Bowler, II

(57) ABSTRACT

Reselection methods for wireless communication devices, for example cellular telephones, that reduce power consumption by receiving periodic paging information (210) concurrently with the performance of periodic signal measurements (230) and reselection processing (250) to increase minimal power consumption mode operation. In some embodiment, the reselection processing (252) is performed on prior signal measurements (230) while obtaining present signal measurement data (240).

20 Claims, 3 Drawing Sheets

RESELECTION OPTIMIZATION IN MOBILE WIRELESS COMMUNICATION DEVICES AND METHODS THEREFOR

FIELD OF THE INVENTIONS

The present inventions relate generally to wireless communications, and more particularly to reselection optimization in wireless communication devices, for example cellular telephones, and methods therefor.

BACKGROUND OF THE INVENTIONS

Mobile cellular communication devices, including cellular telephones and pagers, must generally monitor and process periodic paging information when connected to the network. Mobile cellular telephones also perform neighbor cell reselection processing based upon neighbor cell signal measurements to identify the most appropriate cell, or base station, with which the cellular telephone should communicate.

Many mobile cellular telephones also operate in a minimum power consumption, sometimes referred to as sleep, mode when idling and not monitoring paging network information or performing neighbor cell signal strength measurements and reselection processing.

GSM cellular telephones generally include the foregoing idle mode functionality. Particularly, in GSM cellular telephones, it is known to receive periodic paging blocks and at the same time, between assigned slots, perform neighbor cell signal strength measurements. Thereafter, GSM cellular telephones perform neighbor cell reselection processing based upon the most recent signal strength measurements. In GSM terminals, the reselection processing does not occur until after completion of the signal strength measurements. During other idle periods, when not receiving paging blocks and performing signal strength measurements and when not performing reselection processing, GSM cellular telephones may enter sleep mode to reduce power consumption.

In many hardware designs "sleep mode" cannot be entered until all hardware functional blocks have completed processing, since all clocks are shut down in sleep mode. Sleep mode may be defined differently in other hardware designs.

WCDMA cellular telephones also generally include the foregoing idle mode functionality. Particularly, WCDMA telephones receive periodic paging indicator channel (PICH) blocks, which are much smaller than paging blocks, and at roughly the same time WCDMA telephones perform intra and inter carrier neighbor cell signal strength measurements. The PICH block in the WCDMA architectures directs the terminal to another paging channel (PCH) block only if the PICH block, and particularly the PICH bit assigned to the particular terminal, is set. Existing WCDMA cellular telephones perform neighbor cell reselection processing based upon the signal strength measurements, and like GSM reselection processing discussed above, WCDMA reselection processing does not occur until after completion of the signal strength measurements. During other idle periods, WCDMA telephones may enter sleep mode to reduce power consumption.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

The present invention relates generally to reselection processes in mobile wireless communications devices, for example cellular telephones and pagers, cellular enabled personal digital assistants (PDAs), laptop computers and other mobile wireless communication devices that perform reselection processing, referred to herein generally and collectively as user terminals.

Figure 1:
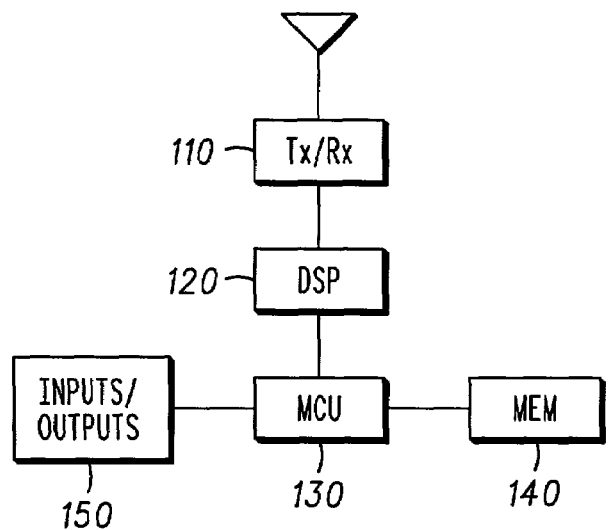
FIG. 1 is a block diagram of a wireless communication device.

In FIG. 1, the exemplary wireless communication device comprises generally a transceiver 110, a digital signal processor (DSP) 120, a controller (MCU) 130 coupled to memory 140 and inputs and outputs 150, which may include, for example, a keypad or keyboard, a display, data input output ports, a microphone, and speaker output.

The transceiver 110 of the mobile wireless communication device generally receives periodic paging information transmitted by the network over some specified interval depending upon the particular communication standard specification.

Figure 2:
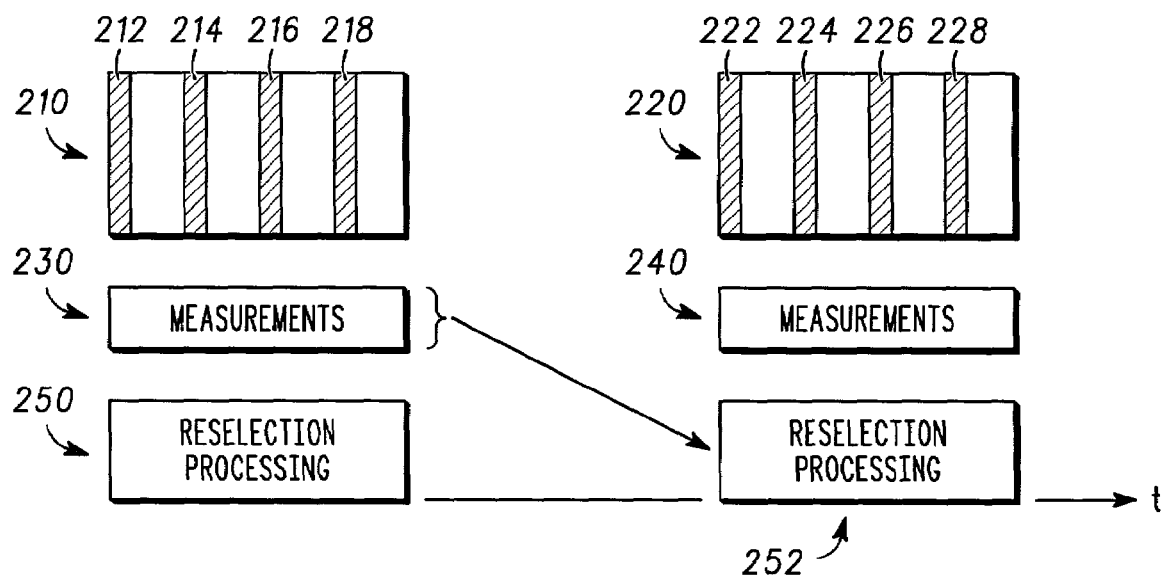
FIG. 2 is an exemplary GSM paging block and reselection processing timing diagram.

In TDMA wireless communication systems, for example in GSM systems, the paging information transmitted by the network is a paging block comprising four frames, wherein each frame is divided into 8 time slots. User terminals are assigned to a time slot in each frame. In FIG. 2, upon receipt of a paging block 210, the user terminal decodes its assigned time slots 212, 214, 216 and 218. The paging block 220 is transmitted later in time after the first paging block 210.

In GSM communication systems, in FIG. 2, during the time that the paging block 210 is received, the user terminal performs neighbor cell signal strength measurements, as indicated by block 230. Particularly, the signal strength measurements are made during the time intervals between assigned slots, but not while decoding the assigned time slots. The signal strength measurements are performed by the DSP, at a periodic rate specified by the particular communication standard. The signal strength measurements indicated at block 240 are made during the subsequently transmitted paging block 220.

Figure 3:
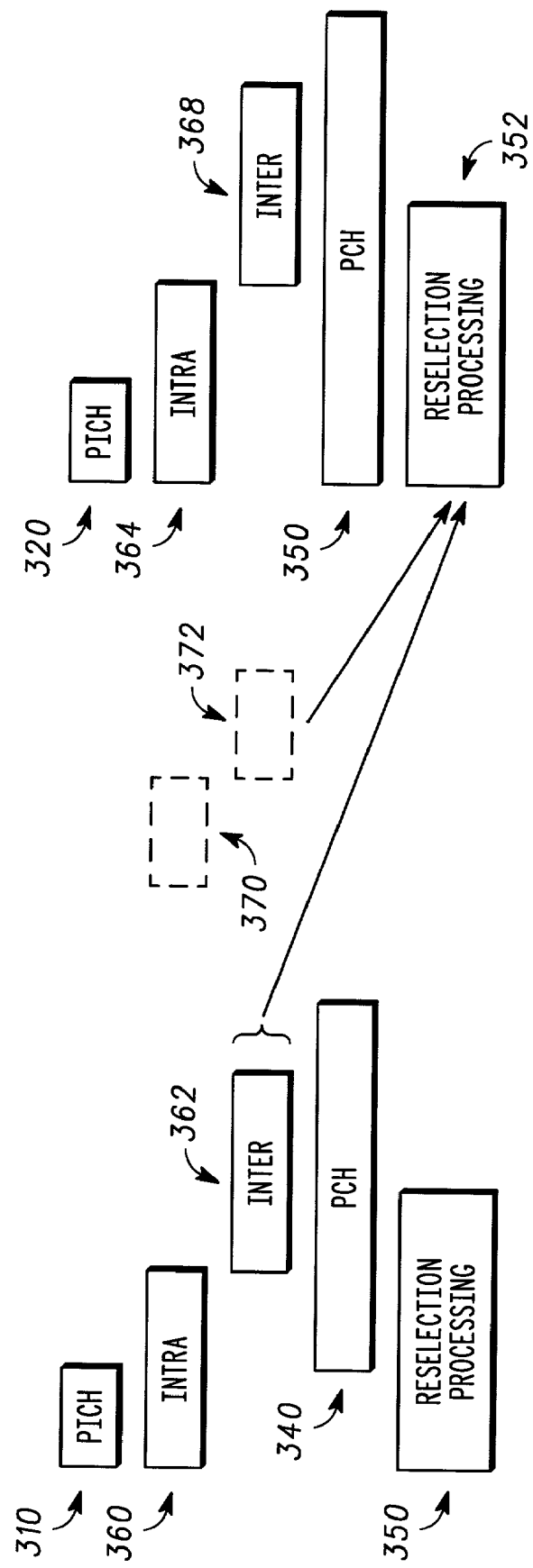
FIG. 3 is an exemplary WCDMA paging block and reselection processing timing diagram.

In wideband code division multiple access (WCDMA) wireless communication systems, for example in 3GPP systems, the paging information transmitted by the network has two parts. In FIG. 3, a periodic paging information channel (PICH) block 310 is sent first by the network. If the PICH bit for a particular terminal in the PICH block is set, then the terminal switches to a paging channel to receive a paging channel (PCH) block 340. If the PICH block is not set, the terminal disregards the PCH block. The PICH block 320 and corresponding PCH block 350 are transmitted later in time after the first PICH block 310 and first PCH block 340.

In WCDMA 3GPP communication systems, in FIG. 3, during and immediately after the time that the paging information (PICH block 310) is received, the user terminal performs intra and inter-frequency signal strength measurements. Particularly, in WCDMA communications systems, signal strength measurements are made on the same carrier frequency at block 360 and on a different carrier frequency at block 362. The signal strength measurements are performed by the DSP, at a periodic rate specified by the particular communication standard. Similar signal strength measurements are made, at blocks 364 and 368, during the subsequent paging block transmission interval.

The user terminal generally performs reselection processing with signal strength measurement to determine the most appropriate cell or frequency to monitor. Reselection algorithms and processing based upon power measurements are well known by those having ordinary skill in the art, and thus are not discussed further herein.

In one embodiment of the invention, power consumption is reduced by receiving at least a portion of the periodic paging information concurrently with performing at least a portion of the periodic signal measurements and performing at least a portion of the periodic reselection processing. By performing these tasks substantially simultaneously, the user terminal may spend more time in the most efficient power saving, or sleep, mode. In FIG. 2, reselection processing occurs at periodic time intervals, identified as blocks 250 and 252, and in FIG. 3 reselection processing occurs at periodic time intervals, identified as blocks 350 and 352.

Figure 4:
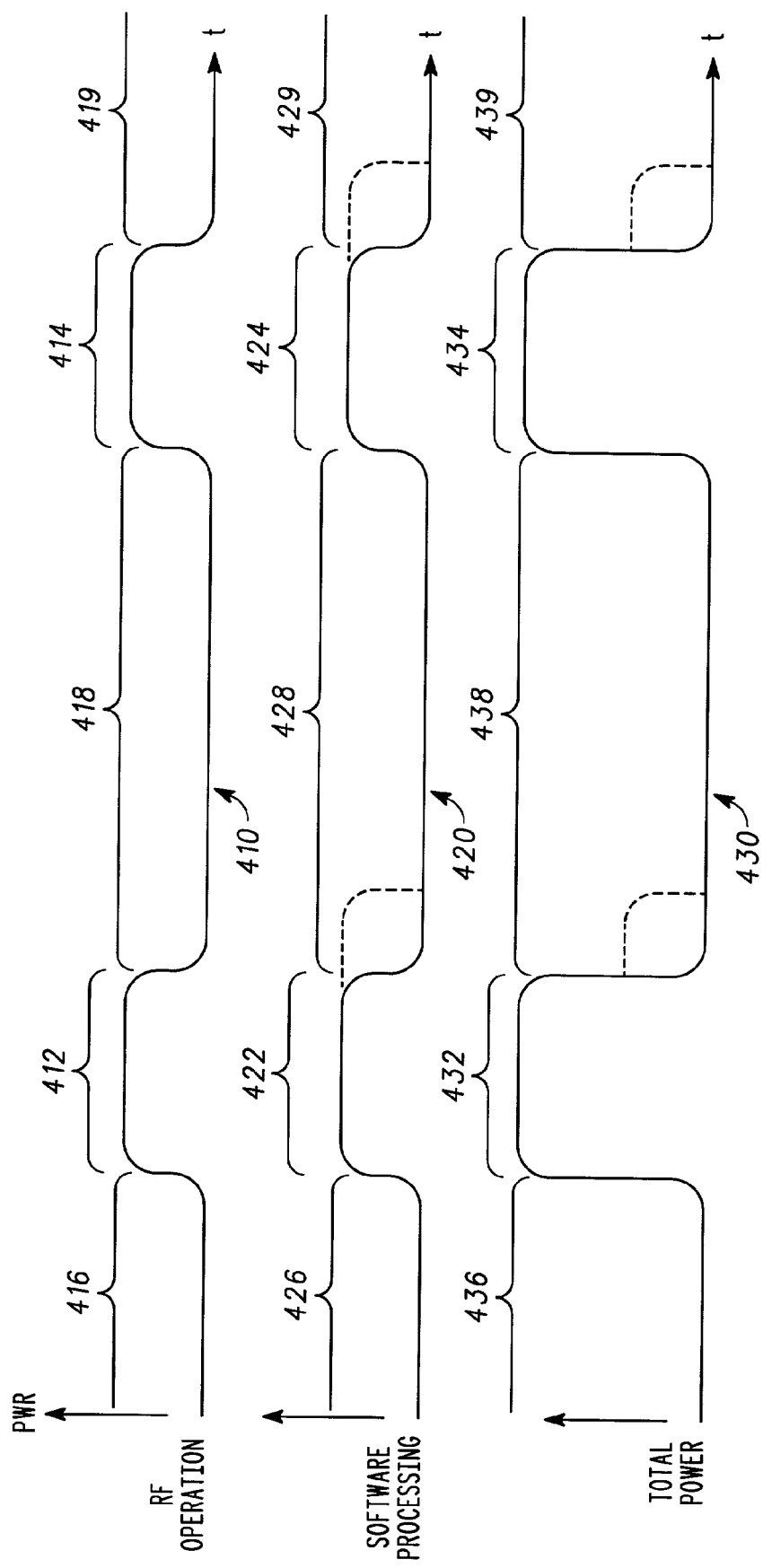
FIG. 4 is an idle mode exemplary power consumption diagram.

FIG. 4 illustrates a time plot 410 of user terminal power consumption for RF hardware operation associated with receiving and decoding paging information and the performance of signal strength measurements. Particularly, during these modes of operation, power is consumed by the receiver, DSP and related circuitry, which is reflected by the increased power consumption at portions 412 and 414 of the plot. At other times, identified by the intervening portions of the plot 416, 418 and 419, power consumption is minimal since paging information is not received and power measurements are not made.

FIG. 4 also illustrates a time plot 420 of the power consumption of the processor associated with reselection processing, for example the execution of reselection algorithms by the MCU or other processor. During these modes of operation, power is consumed by the processor and related circuitry, which is reflected by the increased power consumption at portions 422 and 424 of the plot. At other times, identified by the intervening portions of the plot 426, 428 and 429, power consumption is minimal since reselection software processing is not occurring. The power plots 410 and 420 in FIG. 4 also illustrate that the reselection software processing and RF operation do not necessarily occur precisely within the same time intervals, as indicated by the broken line portion of the reselection processing curve 420.

FIG. 4 also illustrates a plot 430 of the total power, which is a summation of the power consumed during RF operation and during software processing. Alignment of the RF and reselection processing operations will decrease the time periods 432 and 434 of total power consumption and increase the intervening time periods 436, 438 and 439 during which the user terminal may enter a sleep mode and consume minimal power.

In one embodiment of the invention, generally, reselection processing of signal measurements made while decoding a previous paging block are evaluated during the decoding of a subsequent paging block. More particularly, signal strength measurements made during one paging information period are not processed until the next paging information period. This latent processing method complies with 3GPP specification maximum allowed neighbor cell reselection time and provides for maximum sleep opportunity. While the hardware is collecting new measurements on the neighboring cells, the software is evaluating the previous paging block's measurement results for potential reselections. The hardware and software processes are performed in parallel, so that both will finish and allow for sleep sooner than prior implementations where the software evaluation is performed after the hardware has collected the signal measurement data.

In the exemplary GSM system of FIG. 2, for example, the reselection processing occurring at the time period corresponding to block 252 is based upon signal strength measurements made during a previous time period corresponding to block 230, rather than based upon the signal strength measurements made during the time interval corresponding to block 240. Similarly, the reselection processing occurring at block 250 is based upon prior signal strength measurement data, rather than on the signal strength measurement data obtained at block 230.

In the exemplary WCDMA system of FIG. 3, the reselection processing occurring at the time period corresponding to block 352 is based upon the inter and intra-frequency signal strength measurements made during a previous time period corresponding to blocks 360 and 362, rather than based upon the signal strength measurements made during the time interval corresponding to blocks 364 and 368. Similarly, the reselection processing occurring at block 350 is based upon prior signal strength measurement data, rather than on the signal strength measurement data obtained at blocks 360 and 362.

In some communication architecture applications, the delayed processing of signal strength measurements may be required to permit simultaneous decoding of paging information, neighbor cell signal measurements and reselection processing, as discussed above and illustrated in the exemplary embodiments of FIGS. 2 and 3.

Some communication standard specifications may require reselection signal processing of signal strength measurement data within a time frame that is less than the delay period between successive reads of paging information. Thus in some applications, it may be necessary to make additional signal strength measurements to ensure standards compliance. In FIG. 3, for example, if the period of the PICH blocks is too great, additional intra and inter-frequency signal strength measurements may be made between paging block decoding periods, at blocks 370 and 372, for the next reselection processing block, for example at block 352.

To achieve maximum sleep (low power) mode operation a cellular handset completes paging block monitoring and reselection processing required in the shortest time possible by substantially simultaneously performing reselection processing and signal measurement data collection.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a mobile wireless communication device, comprising:
   receiving present paging information;
   performing present signal measurements while receiving the present paging information;
   performing present reselection processing on prior signal measurements while performing present signal measurements.

2. The method of claim 1, performing prior signal measurements while receiving prior paging information before receiving the present paging information.

3. The method of claim 1, reducing power consumption by performing the present reselection processing on the prior signal measurements while receiving the present paging information, performing prior signal measurements while receiving prior paging information before receiving the present paging information.

4. The method of claim 1, reducing power consumption by performing the present reselection processing, based upon the prior signal measurements, and receiving the present paging information in a substantially overlapping time period.

5. The method of claim 1, entering a minimal power consumption mode while not receiving paging information and not performing signal measurements and not performing reselection processing.

6. The method of claim 5, maximizing minimal power consumption mode operation by performing the reselection processing while substantially concurrently receiving the paging information.

7. The method of claim 1, receiving present paging information, performing present signal measurements, and performing reselection processing while operating the wireless communication device in idle mode.

8. A method in a mobile wireless communication device that receives paging information and performs neighbor signal measurements, comprising:
receiving present paging information;
performing present signal measurements while receiving the present paging information;
performing reselection processing while receiving present paging information;
reducing power consumption by performing the reselection processing on prior signal measurements performed while receiving prior paging information.

9. The method of claim 8, entering a minimal power consumption mode when not receiving paging information and not performing signal measurements and not performing reselection processing.

10. The method of claim 8, maximizing minimal power consumption mode operation by performing the reselection processing while substantially concurrently receiving the paging information.

11. The method of claim 8, receiving present paging information, performing present signal measurements, and performing reselection processing while operating the wireless communication device in idle mode.

12. A method in a wireless communication device, comprising:
receiving periodic paging information;
performing periodic signal measurements;
performing periodic reselection processing;
reducing power consumption by receiving at least a portion of the periodic paging information concurrently with performing at least a portion of the periodic signal measurements and performing at least a portion of the periodic reselection processing.

13. The method of claim 12, performing present reselection processing on prior signal measurements while performing present signal measurements.

14. The method of claim 12, operating in a minimal power consumption mode when not receiving periodic paging information and not performing periodic signal measurements and not performing periodic reselection processing.

15. A method in a TDMA wireless communication device that receives periodic paging blocks and performs periodic neighbor signal measurements, comprising:
receiving a present paging block;
performing present neighbor cell signal strength measurements while receiving the present paging block;
performing reselection processing for prior neighbor cell signal strength measurements while receiving the present paging block and performing the present neighbor cell signal strength measurements.

16. The method of claim 15, reducing power consumption by operating in a minimal power consumption mode when not receiving periodic paging blocks and not performing periodic neighbor cell signal strength measurements and not performing reselection processing.

17. The method of claim 15, reducing power consumption by receiving at least a portion of the periodic paging blocks, performing at least a portion of the periodic neighbor cell signal strength measurements, and performing at least a portion of the reselection processing concurrently.

18. A method in a WCDMA wireless communication device that receives periodic paging indicator channel blocks and performs periodic reselection processing, comprising:
receiving a present paging indicator channel block;
performing present signal measurements while receiving the present paging indicator channel block;
performing reselection processing for prior signal measurements while receiving the present paging indicator channel block and performing the present signal measurements.

19. The method of claim 18, reducing power consumption by operating in a minimal power consumption mode when not receiving periodic paging indicator blocks and when not performing periodic signal measurements and not performing reselection processing.

20. The method of claim 18, performing signal measurements between receiving periodic paging indicator blocks when the period between the periodic paging indicator blocks is greater than a predetermined period.

* * * * *